(No Model.)

J. B. BLYHOLDER & P. HUGHES.
BRIDLE BIT.

No. 296,815. Patented Apr. 15, 1884.

Attest:
Charles Pickles
John W. Herthel

Inventors:
John B. Blyholder
Phillip Hughes
per
Herthel & Co
Attys

UNITED STATES PATENT OFFICE.

JOHN B. BLYHOLDER AND PHILLIP HUGHES, OF ST. LOUIS, MISSOURI.

BRIDLE-BIT.

SPECIFICATION forming part of Letters Patent No. 296,815, dated April 15, 1884.

Application filed January 21, 1884. (No model.)

*To all whom it may concern:*

Be it known that we, JOHN B. BLYHOLDER, a citizen of the United States, residing at St. Louis, Missouri, and PHILLIP HUGHES, a subject of the Queen of Great Britain, a resident of the United States for more than one year, having declared my intention of becoming a citizen of the United States, and residing at St. Louis, and State of Missouri, have invented a new and useful Bridle-Bit, of which the following is a specification.

Our invention is an improved bridle-bit, specially serviceable for horses, &c., that have the habit, commonly styled, of "wind-sucking" or forcing air from the mouth to the stomach; and our invention can be stated to be a bridle-bit made hollow or tubular, and preferably T shape, by means whereof the air drawn or "sucked" into the mouth of the horse, &c., is directed to enter and circulate through the bridle-bit and escape outside the mouth of the animal, all of which will now more fully appear. We attain these objects by the mechanism illustrated in the accompanying drawings, in which—

Figure 1:
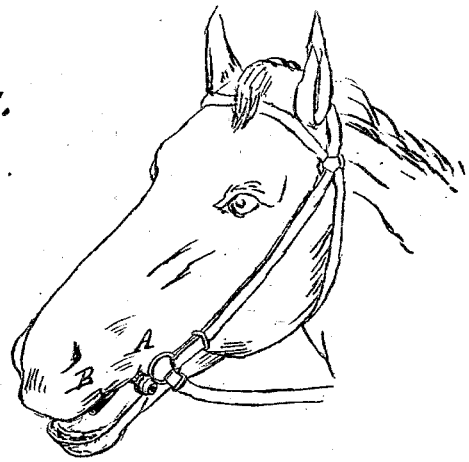
Figure 2:
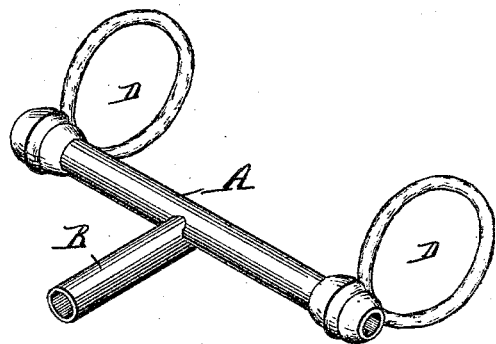
Figure 3:
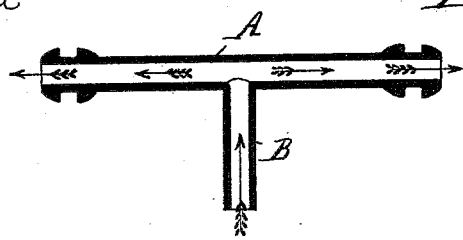

Figure 1 shows our improved bridle-bit practically applied and used. Fig. 2 is a perspective view of the bridle-bit, showing its T shape and tubular form, its rings attached and ready for use. Fig. 3 is a section of Fig. 2, the arrows indicating the course of the air forced to enter the central tube and escaping at the opposite ends of the bridle-bit proper.

Our bridle-bit consists of the hollow metal tubes A and B, joined together in the shape of a T. (See Figs. 2, 3.) The tube A is arranged transversely to form the bit proper, while the tube B extends centrally from that of A in a longitudinal direction, as indicated in Figs. 1, 2, 3. Both the tubes A and B being in communication, and hollow throughout, any air forced to enter the bit through the central tube, B, can branch in either direction through and out of the transverse tube A, as shown by the arrows, (see Fig. 3,) and it is this action or new result that is achieved by our invention.

Our bridle-bit is placed or fitted in the mouth of the animal so that the transverse tube A shall be in the usual position for the bit proper, while the central tube, B, protrudes forward to the front of the mouth and above the tongue of the horse or other animal. (See Fig. 1.) When the horse sucks wind or draws the air inward, the lips are clinched together and an effort is made to force the air so confined in the closed mouth into the stomach. The central tube of our bridle-bit lies on top of and in line with the tongue and about an inch away from the teeth; hence the effort to force the air into the stomach serves to force the air into the hollow bridle-bit, entering first the central tube, thence circulating through the transverse bit, and escaping at either or both opposite ends thereof outside of the mouth of the horse.

D are the bridle-rings, as usual.

Our bridle-bit can be used in manner usual, besides being a practical means to cure or remedy a complaint or injurious habit, as above stated.

What we claim is—

The improved bridle-bit consisting of the hollow or tubular transverse bit A, having a central tube, B, at a right angle thereto, and in communication therewith, substantially as and for the purposes set forth.

In testimony of said invention we have hereunto set our hands.

JOHN B. BLYHOLDER.
PHILLIP HUGHES.

Witnesses:
WILLIAM W. HERTHEL,
JOHN W. HERTHEL.